US008646291B2

(12) United States Patent
Coppola et al.

(10) Patent No.: US 8,646,291 B2
(45) Date of Patent: Feb. 11, 2014

(54) APPARATUS AND METHOD FOR CONTROL OF GLASS STREAMS IN LAMINATE FUSION

(75) Inventors: Frank Thomas Coppola, Horseheads, NY (US); Michael Ryan Harshberger, Corning, NY (US); Monica Jo Mashewske, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 76 days.

(21) Appl. No.: 13/479,701

(22) Filed: May 24, 2012

(65) Prior Publication Data
US 2013/0312459 A1 Nov. 28, 2013

(51) Int. Cl.
*C03B 17/06* (2006.01)
(52) U.S. Cl.
USPC .............. 65/195; 65/53; 65/98; 264/165
(58) Field of Classification Search
USPC .............. 65/32.2, 33.4, 52, 53, 98, 195; 156/309.6; 427/420; 264/165, 173.11, 264/173.12
See application file for complete search history.

(56) References Cited

U.S. PATENT DOCUMENTS

| 1,623,051 | A | * | 4/1927 | Fraser | 65/41 |
| 1,673,907 | A | * | 6/1928 | Ferngren | 65/53 |
| 1,734,964 | A | * | 11/1929 | Danner | 65/50 |
| 1,734,965 | A | * | 11/1929 | Danner | 65/45 |
| 1,836,394 | A | * | 12/1931 | Reece | 65/53 |
| 3,607,182 | A | * | 9/1971 | Leibowitz | 65/53 |
| 4,214,886 | A | * | 7/1980 | Shay et al. | 65/121 |
| 4,384,015 | A | * | 5/1983 | Koepke et al. | 427/402 |
| 4,525,194 | A | * | 6/1985 | Rudoi | 65/145 |
| 4,678,719 | A | | 7/1987 | Johns et al. | 428/593 |
| 6,196,026 | B1 | * | 3/2001 | Anderson et al. | 65/44 |
| 6,748,765 | B2 | * | 6/2004 | Pitbladdo | 65/53 |
| 6,997,017 | B2 | * | 2/2006 | Pitbladdo | 65/53 |
| 7,201,965 | B2 | * | 4/2007 | Gulati et al. | 428/426 |
| 7,514,149 | B2 | * | 4/2009 | Bocko et al. | 428/426 |
| 8,007,913 | B2 | * | 8/2011 | Coppola et al. | 428/426 |
| 8,042,361 | B2 | * | 10/2011 | Pitbladdo | 65/195 |
| 8,211,505 | B2 | * | 7/2012 | Bocko et al. | 427/420 |
| 8,359,887 | B2 | * | 1/2013 | Bisson et al. | 65/101 |

(Continued)

FOREIGN PATENT DOCUMENTS

| JP | 3046836 | 5/2000 | C03B 20/00 |
| JP | 2000-344534 | 12/2000 | C03B 17/04 |
| KR | 10-2007-0108252 | 11/2007 | C03B 17/06 |

OTHER PUBLICATIONS

International Search Report and Written Opinion, dated Aug. 21, 2013, PCT/US2013/041804.

*Primary Examiner* — Jason L Lazorcik
(74) *Attorney, Agent, or Firm* — John L. Haack

(57) ABSTRACT

An apparatus for forming laminated sheet glass and a method for forming laminated sheet glass or articles using the glass laminating apparatus, the apparatus including: a lower fusion pipe providing a first liquid stream that forms the core of the laminate; a first upper fusion pipe having a pair of adjustable baffles situated between the bottom of the upper fusion pipe and the top of the lower fusion pipe, the first upper fusion pipe provides a second liquid glass stream onto the first liquid glass stream that forms the clad of the laminate on the core of the laminate, the adjustable baffles being separated from the lower fusion pipe by a gap, and the adjustable baffles control the landing angle ($\phi$) and drop point of the second liquid glass stream onto the first liquid glass stream.

16 Claims, 9 Drawing Sheets

(56) References Cited

U.S. PATENT DOCUMENTS

| | | | |
|---|---|---|---|
| 2001/0039814 A1* | 11/2001 | Pitbladdo | 65/193 |
| 2004/0093900 A1* | 5/2004 | Fredholm | 65/25.3 |
| 2004/0197575 A1* | 10/2004 | Bocko et al. | 428/432 |
| 2007/0190340 A1* | 8/2007 | Coppola et al. | 428/432 |
| 2009/0162545 A1* | 6/2009 | Bocko et al. | 427/209 |
| 2010/0281921 A1* | 11/2010 | Bisson et al. | 65/101 |
| 2012/0234050 A1* | 9/2012 | Bocko et al. | 65/195 |

* cited by examiner

APPARATUS AND METHOD FOR CONTROL OF GLASS STREAMS IN LAMINATE FUSION

CROSS-REFERENCE TO RELATED APPLICATIONS

This application is related to commonly owned and assigned U.S. Pat. No. 8,007,913, issued Aug. 30, 2011, to Coppola, et al., entitled "Laminated Glass Articles and Methods of Making Thereof," the content of which is relied upon and incorporated herein by reference in its entirety, but does not claim priority thereto.

The entire disclosure of any publication or patent document mentioned herein is incorporated by reference.

BACKGROUND

The disclosure relates to an apparatus and method for control of glass streams in laminate fusion glass manufacture.

SUMMARY

The disclosure provides an apparatus and method for control of glass streams in laminate fusion glass manufacture.

BRIEF DESCRIPTION OF DRAWINGS

In embodiments of the disclosure.

DETAILED DESCRIPTION

Figure 1:
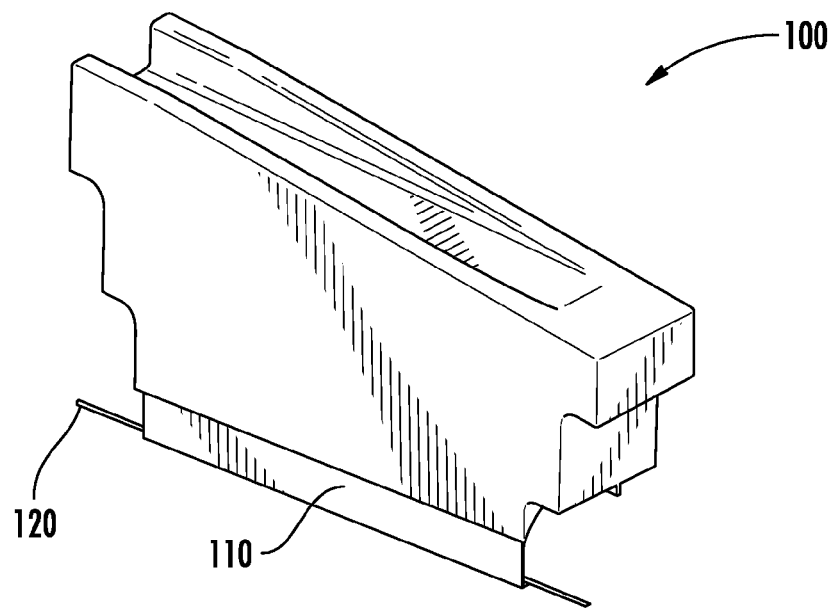
FIG. 1 shows in perspective an example of an upper clad fusion pipe (100) having one or more baffles (110), which upper pipe is capable of delivering uniform clad glass flow across its length to a lower fusion pipe situated below the upper clad fusion pipe using one or more adjustment rods (120).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed apparatus, and the disclosed method of making provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Optional" or "optionally" means that the subsequently described event or circumstance can or cannot occur, and that the description includes instances where the event or circumstance occurs and instances where it does not.

"Consisting essentially of" in embodiments can refer to, for example:

an apparatus having adjustable baffles for making a laminated glass article; and a method of making a laminated glass article using the disclosed apparatus having adjustable baffles, as defined herein.

The apparatus having adjustable baffles for making the laminated glass article, the method of making the laminated glass article, the resulting laminated glass article, the compositions, or the formulations, of the disclosure can include the components or steps listed in the claim, plus other components or steps that do not materially affect the basic and novel properties of the compositions, articles, apparatus, or methods of making and use of the disclosure, such as particular glass compositions, particular additives or ingredients, a particular agent, a particular structural material or component, a particular melt or draw condition, or like structure, material, or process variable selected.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, and like aspects, and ranges thereof, are for illustration only; they do not exclude other defined values or other values within defined ranges. The apparatus, and methods of the disclosure can include any value or any combination of the values, specific values, more specific values, and preferred values described herein, including explicit or implicit intermediate values and ranges.

The fusion laminate process as disclosed in U.S. Pat. No. 4,214,886, combines two glasses of different compositions into a two (2) or three (3)-layered laminated sheet. It has been determined by, for example, oil model simulation, mathematical modeling, and observation, that the drop distance of the glass stream or flow from the upper pipe, which provides the source of the cladding glass or outer layer glass, onto the glass in the lower pipe, which provides the source of the core glass, is significant in maintaining excellent glass quality of the final laminated sheet. It is generally believed that the velocity of the two liquid glass streams when they come together must be nearly equal. The drop distance, coupled with the liquid glass viscosity, establishes the velocity of the upper glass stream. Additionally, the distance between the two pipes is preferably uniform, or very close to uniform. Stated alternatively, the distance between the lowest portion of the upper pipe and the upper most portion of the lower pipe is substantially equidistant, or has a gap or separation dimension between the pipes that is approximately the same. Satisfying at least these criteria call for an apparatus having a wide range of motion. When the drop distance between the lowest portion of the upper pipe and the upper most portion of the lower pipe is not substantially equidistant laminate defects can result. In embodiments, the disclosed apparatus having adjustable baffles can correct differences in the separation dimension, i.e., the pipe gap, the pipe tilt, or both, between the upper and lower pipes.

In embodiments, the disclosed apparatus and method provide greater flexibility to the range of pipe movement and can reduce the complexity of the apparatus.

In embodiments, the disclosure provides an apparatus and method for controlling the confluence of glass streams in laminate fusion processing and the quality of the resultant laminate glass sheet. The disclosed apparatus includes and the method provides baffles (a.k.a., confluence adjustment plates (CAPs)) that can move, for example, vertically, such as in recesses or slots, at the bottom region of the upper pipe. These baffles can be fabricated from any of a variety of suitable materials and can be located at or along both long- or lateral-sides of the upper pipe. In embodiments, the baffles preferably can be the same length as the pipe root. The height of the baffles is sufficient to accommodate the required movements and separations between the upper pipe and lower pipe. In embodiments, the adjustment for the pipe gap and the pipe tilt can be provided by, for example, rods at the distal ends of each baffle, and which rods can project to the exterior of the apparatus.

Through the use of the baffles, the gap uniformity and gap distance between the upper and lower pipes can be easily manipulated. The need for this adjustment capability arises when one or both of the pipes must be tilted to satisfy changing process conditions, such as temperature, glass composition(s), relative glass flow rates, relative glass viscosities, and like considerations, or combinations thereof.

In embodiments, the disclosure provides an apparatus for forming laminated sheet glass, comprising:

a lower pipe providing a first overflow glass melt liquid stream that forms the core of the laminate sheet glass product;

an first upper pipe having a pair of adjustable baffles (i.e., confluence adjustment plates) situated between the bottom of the upper pipe and the top of the lower pipe, the first upper pipe provides a second overflow melt liquid glass stream onto the first liquid glass stream that forms the clad of the laminate on the core of the laminate;

the adjustable baffles being separated (or spaced) from the lower pipe by a gap and a tilt angle, and the adjustable baffles control the landing angle ($\Phi$) and the drop point or drop line of the second liquid glass stream onto the first liquid glass stream.

In embodiments, the adjustable baffles can, for example, be adjusted vertically to control the separation dimension of the gap between the adjustable baffles of the upper pipe and the top of the lower pipe. In embodiments, the adjustable baffles can, for example, be independently or coordinately adjusted angularly outwardly, inwardly, or both, to control the landing angle ($\Phi$) of the second overflow glass melt stream onto the first overflow glass melt stream. In embodiments, the adjustable baffles can be, independently or coordinately, adjusted both angularly and vertically, for example, simultaneously or sequentially.

In embodiments, the adjustable baffles can be, for example, situated within the bottom of or directly below the first upper pipe and generally extend downward toward the top of the lower pipe.

In embodiments, the spatial orientation of the lower pipe relative to the upper pipe can be fixed in space. In embodiments, the lower pipe, and upper pipe having the pair of baffles, can each be separately supported, and preferably need not be connected to one other. In embodiments, the lower pipe and upper pipe can be configured such that each pipe can be independently moved or adjusted with respect to the other pipe.

In embodiments, the adjustable baffles can be connected to the upper pipe at one end or edge, and each of the adjustable baffles can have at least one adjustment rod, for example, near the gap end or edge, or the adjustable baffles can be connected to any other suitable location, to adjust the gap dimension. In embodiments, the adjustable baffles need not be connected or fastened to the upper pipe. Instead, the adjustable baffles can be held in close proximity to the bottom of the upper pipe without any direct connection or fastening to the upper pipe.

In embodiments, the molten glass feed or feeds that supply the lower pipe and the upper pipe can be provided by any suitable method or direction, for example, from the same end or side of the pipes, or the opposite ends or sides of the pipes.

In embodiments, one baffle of a pair of adjustable baffles can be positioned differently from the other baffle of the pair to provide a flow difference over one weir of the upper pipe compared to the other weir of the upper pipe. The differential flow provides a laminate sheet glass having a thicker clad on one side of the core glass and a thinner clad on the other side of the core glass, that is, having a differential clad lamination thickness, which differential thickness property can be useful in, for example, wedge laminate geometry applications.

In embodiments, the apparatus of the disclosure can further comprise a plurality of upper pipes, such as from about 2 to about 10 additional upper pipes, each additional upper pipe optionally having a pair of adjustable baffles situated between the bottom of each additional upper pipe and the top of a preceding upper pipe situated below. Each additional upper pipe can provide an additional overflow melt liquid glass stream onto the preceding liquid glass stream that forms an additional clad layer on one or both sides of the laminate. The apparatus having a plurality of upper pipes having adjustable baffles can be used to make multi-layer laminated glass. In embodiments, the method of forming laminated sheet glass can further comprise having a plurality of upper pipes having a pair of adjustable baffles stacked above the upper pipe to provide a laminate sheet glass where the total number of cladding layers in the laminate corresponds to twice the total number of upper pipes.

In embodiments, the separation dimension or gap between the distal ends of the adjustable baffles and the lower pipe can be substantially equidistant across the entire span of the gap, i.e., uniform or substantially uniform separation dimension. In embodiments, the separation dimension or gap between the adjustable baffles and the lower pipe can be, intentionally or inadvertently, non-equidistant across the entire span of the gap, i.e., substantially non-uniform. In embodiments, the separation dimension or gap between the adjustable baffles and the lower pipe can be a combination of uniform or substantially uniform separation dimension and non-uniform separation dimension, i.e., the adjustable baffles can each be adjusted independently to provide the respective gaps having the same dimension on opposing sides, or provide the respective gaps having different dimensions on opposing sides.

In embodiments, the disclosure provides a method for forming laminated sheet glass in the abovementioned apparatus, comprising:

flowing a first liquid glass stream over the lower pipe to form the core of the laminate;

flowing a second liquid glass stream over the upper pipe, then the pair of adjustable baffles, and then onto to the first liquid core glass stream to form the clad of the laminate on the solidified core glass of the laminate.

In embodiments, the method of forming laminated sheet glass can further comprise adjusting the adjustable baffles to change at least one of: the gap; the tilt angle ($\theta$), the landing angle ($\Phi$), drop line, or combinations thereof, of the second liquid glass stream onto to the first liquid glass stream.

In embodiments, the disclosed apparatus having upper pipe baffles, and the method of selectively or systematically adjusting the baffles and consequent glass stream flow and glass stream confluence can provide a solution to the issues posed by matching the velocities of the cladding glass stream(s) and the core glass stream.

In embodiments, advantages of the disclosed apparatus and method of using the disclosed apparatus can include, for example:

If flow adjustments are needed to change the thickness ratios of a laminate's three-layers (i.e., outer clad-inner core-outer clad), the viscosity of the liquid glass in the upper pipe's trough can be, for example, changed, or the upper pipe can be tilted.

If the upper pipe is tilted relative to the lower pipe, the gap between the two pipes can become non-uniform. This situation can easily be corrected by manipulating one or both of the disclosed baffles to provide the gap having a uniform separation dimension, that is, an equidistant separation.

If the core glass temperature in the lower pipe's trough is modified, the viscosity of the glass stream coming from the clad upper pipe is also modified, thus affecting the glass stream velocity from the upper pipe. This situation calls for a gap change, which can be readily accomplished by manipulating one or both of the disclosed baffles to achieve the proper adjustment and compatible glass stream flows.

By slightly angling the baffles from a vertical position, such as outwardly, the landing position of the glass stream from the upper pipe can be located at, or redirected to, one or more different positions across the weir (or barrier) of the lower pipe.

Referring to the Figures, FIG. 1 shows in perspective an example of an upper clad fusion pipe (100) having one or more baffles (110), which upper pipe is capable of delivering uniform clad glass flow across its length (i.e., the long sides) to a lower fusion pipe situated below the upper clad fusion pipe using one or more adjustment rods (120). The upper clad glass pipe has at the bottom of the pipe one or more adjustable baffles (110) (only one long side shown).

Figure 2A:
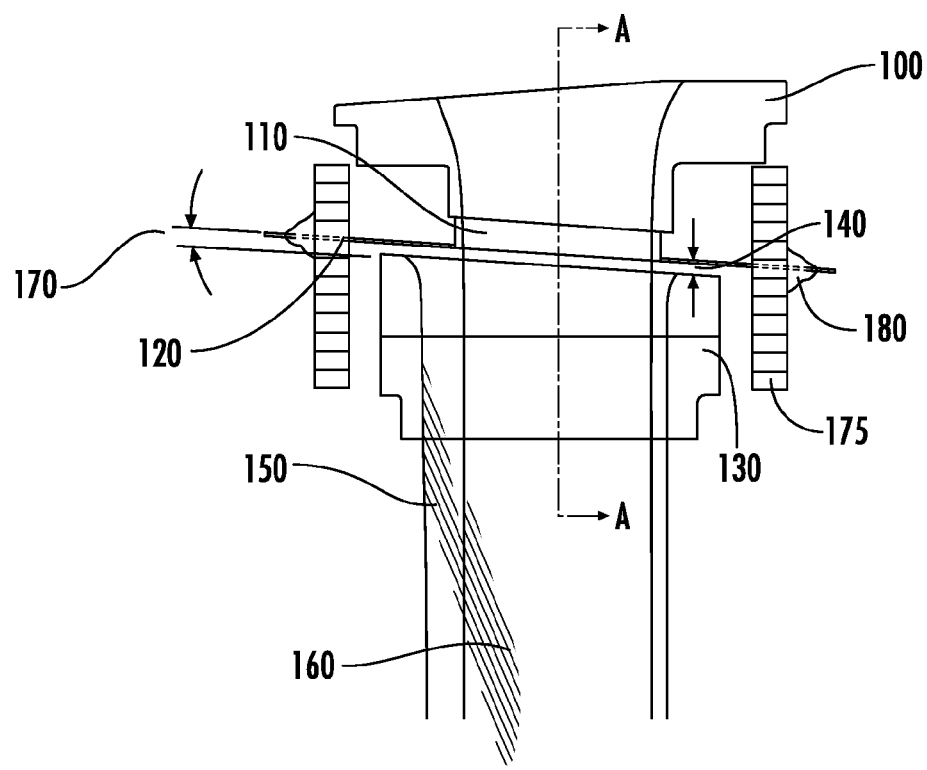
FIGS. 2A and 2B, respectively, show elevation views of examples of a "normal" position (i.e., aligned or parallel upper and lower pipes) and an "abnormal" position (i.e., skewed or non-parallel upper and lower pipes) as defined herein.

FIG. 2A shows an elevation view of an example of a "normal" position, i.e., having an aligned or parallel upper clad pipe (100) and lower core pipe (130), and having a uniform gap (140) at the confluence (not shown) of the two glass streams provided by the adjustable baffle (110). The rod (120) extending out at the ends of the baffle (110) can be used for maintaining or changing the relative position of the baffle and for achieving relative motion or adjustment of the baffle, for example, to move the baffle up or down, either to adjust the total gap dimension (140) or to change the tilt angle ($\theta$) (170). The tilt angle ($\theta$) is the angle at which glass melt stream (160) from the upper clad pipe lands on the glass melt stream (150) flowing from the lower core pipe (130) in the absence of the adjustable baffle(s). The tilt angle (A) can be, for example, from 0 to 20°, from 1 to 15°, from 1 to 10°, from 1 to 5°, including intermediate values and ranges. The rods can project, for example, out of the muffle furnace having refractive barrier wall(s) (175) for baffle gap and tilt angle adjustment convenience. The rods can be further supported by any suitable structure, such as one or more adjustable holder mount (180).

Figure 2B:
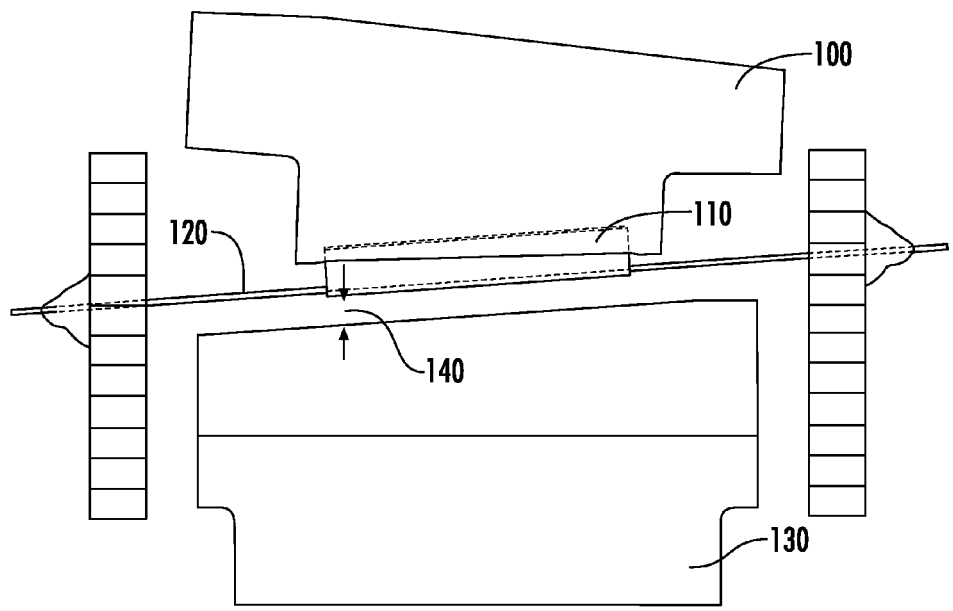

FIG. 2B shows an elevation view of an example of an "abnormal" position, i.e., having a skewed or non-parallel upper clad-source pipe (100) and lower core-source pipe (130), and having a uniform gap (140) at the confluence (not shown) of the two glass streams. The manifestation of the abnormal or skewed relation between the pipes can be cured by the adjustable baffle (110) (partially shown with a hidden line) by, for example, the adjusting the gap (140) dimension with adjustment rod (120) to obtain a uniform gap (140).

Figure 3:
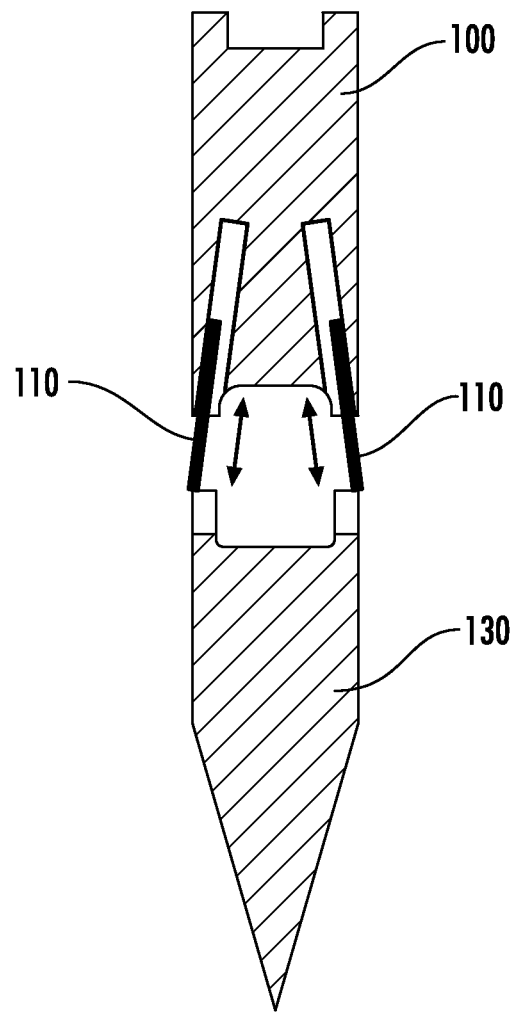
FIG. 3 shows a cross-section (A-A) elevation view of the apparatus of FIG. 2A showing the upper clad pipe (100) and the fitted lower core pipe (130).

FIG. 3 shows a cross-section (A-A) elevation view of the apparatus of FIG. 2A showing the upper clad pipe (100) and the fitted lower core (130) pipe. In embodiments, the baffles (110) can reside within, for example, angled (shown here) recesses or vertical recesses (shown in FIGS. 5 to 7) in the upper pipe, and which baffles can be adjusted, such as extended downward or retracted upward, to provide a uniform gap (140) at the confluence of the two glass streams. The gap (140) dimension shown here is "closed" or nearly so, and is very small or zero, such as when the baffles are fully extended downward toward or contacting the lower pipe (130). In embodiments, the gap (140) dimension can be, for example, from 0.1 to 20 inches or more, from 0.1 to 10 inches, from 0.2 to 8 inches, from 0.3 to 6 inches, including intermediate values and ranges. Changing the gap dimension changes, such as incrementally, or continuously, the velocity of the glass stream flowing from the clad pipe.

Figure 4:
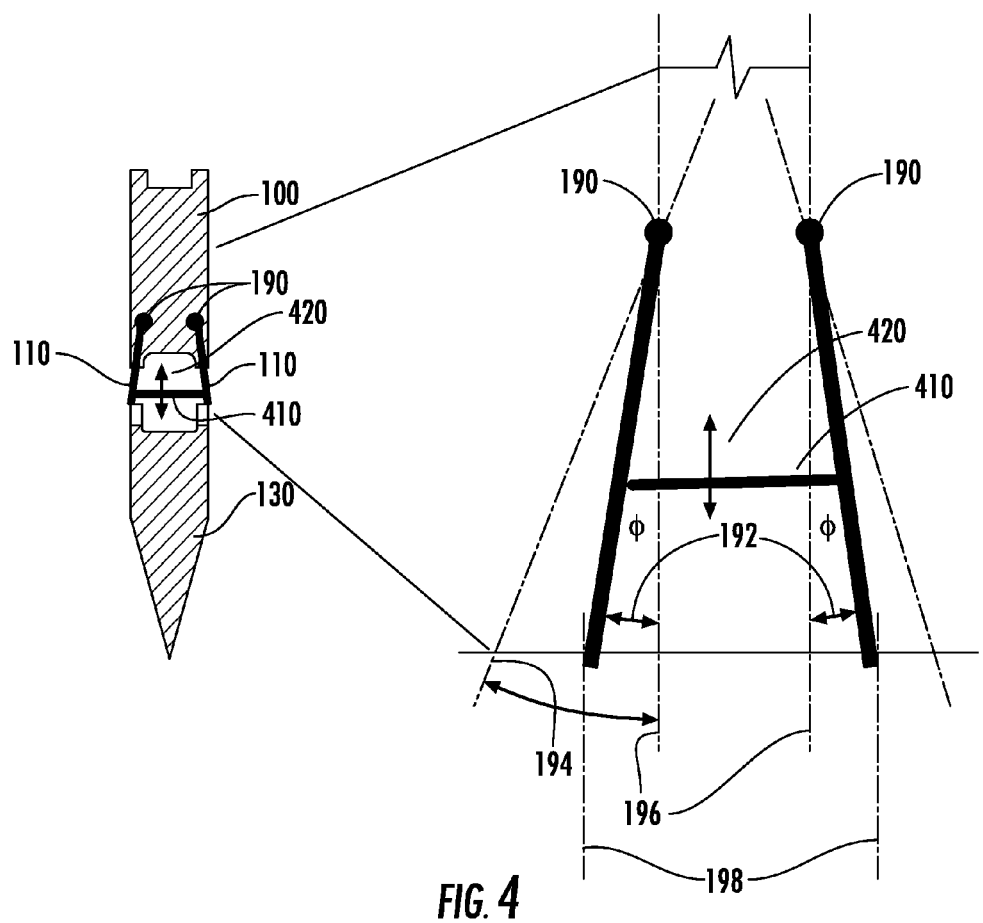
FIG. 4 shows another cross-section elevation view of another example of the clad pipe (100) and core pipe (130) illustrating an example of applying an angle ($\Phi$) to one or both of the baffles (110), which alters the landing position of the clad glass stream delivered from the upper pipe onto the core glass stream in the lower pipe.

FIG. 4 shows another cross-section elevation view of another example of the clad pipe (100) and core pipe (130) illustrating an example of applying an angle to the baffles (110), which alters the landing position of the clad glass stream onto the core glass stream in the lower pipe. Here the baffles (110) are configured to pivotally adjust in a manner that the baffles pivot about pivot points (190). Pivoting the baffles, such as inwardly (not shown; one or both $\Phi$ angles reside within the region defined by vertical reference line(s) (196)), outwardly (194) (one or both $\Phi$ angles reside outside of the region defined by zero landing angle deflection reference line(s) (196), i.e., the vertical having infinite slope or $\Phi=0°$), or a combination thereof, can change the "landing" angles ($\Phi$) (192) and the corresponding "drop" lines (198) of the clad glass stream flowing onto the core glass stream. The "drop" line (198) is a reference line that represents the inner most flow edge portion of the upper clad glass stream on the outer most edge of the baffle(s). In embodiments, the disclosed apparatus and method can be used to beneficially control or adjust, as needed, the drop line by altering the vertical, horizontal, or both, positions of one or both of the baffles (110). In embodiments, the pivoting of the baffles can be linked together by, for example, a slideable tie rod (410), spreader member, or like member or mechanism. Raising or lowering (double headed arrow; 420) the tie rod (410) by any suitable means (not shown) can cause the baffles to displace substantially equally outwardly or inwardly. The tie rod (410) can be actuated by one or more adjustment rods (120), which rods are shown in FIGS. 1 and 2. The pivoting action (e.g., 194) of the baffles (110) permits flow control and location control of the upper clad glass stream onto the lower core glass stream.

Figure 5A:
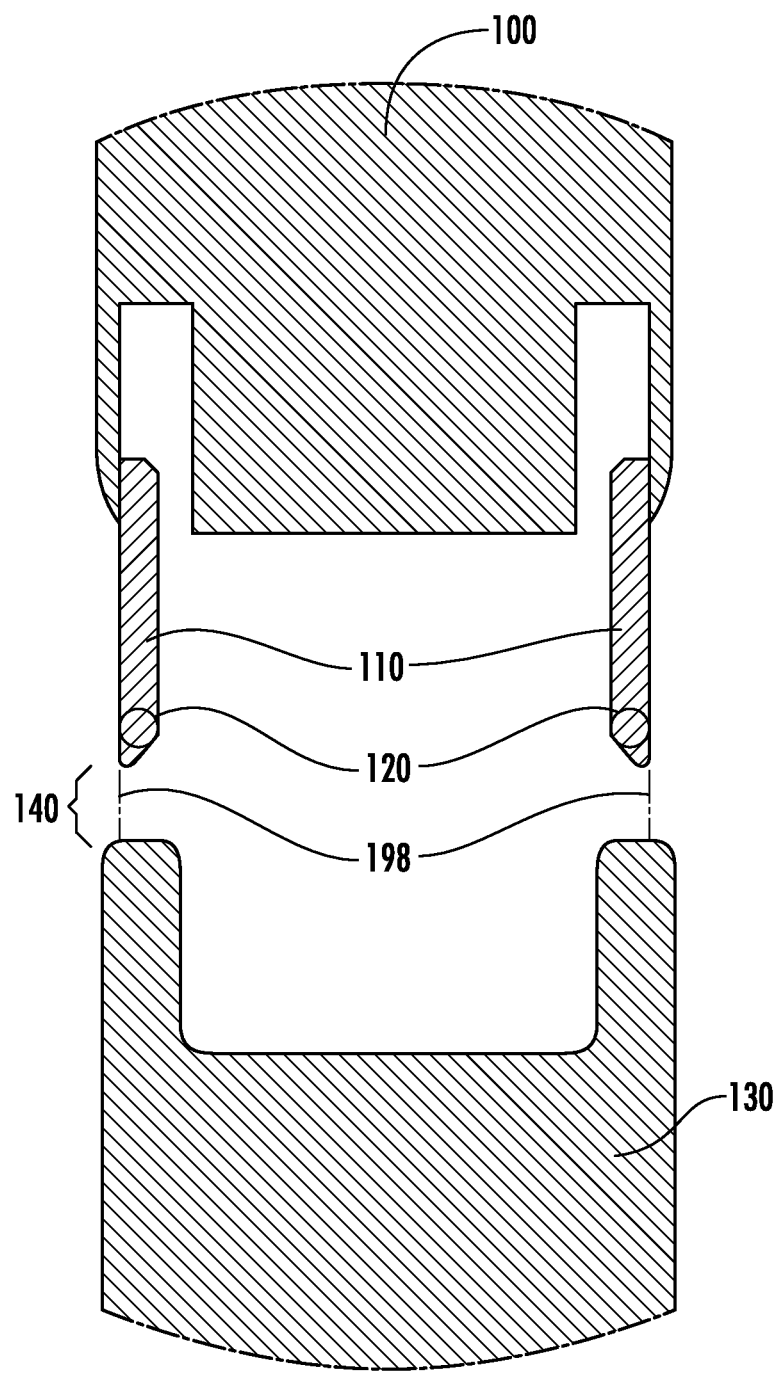
FIGS. 5A and 5B show cross-section elevation views of another example of the clad pipe (100) and core pipe (130) pair having vertically displaceable baffles (110).
Figure 5B:
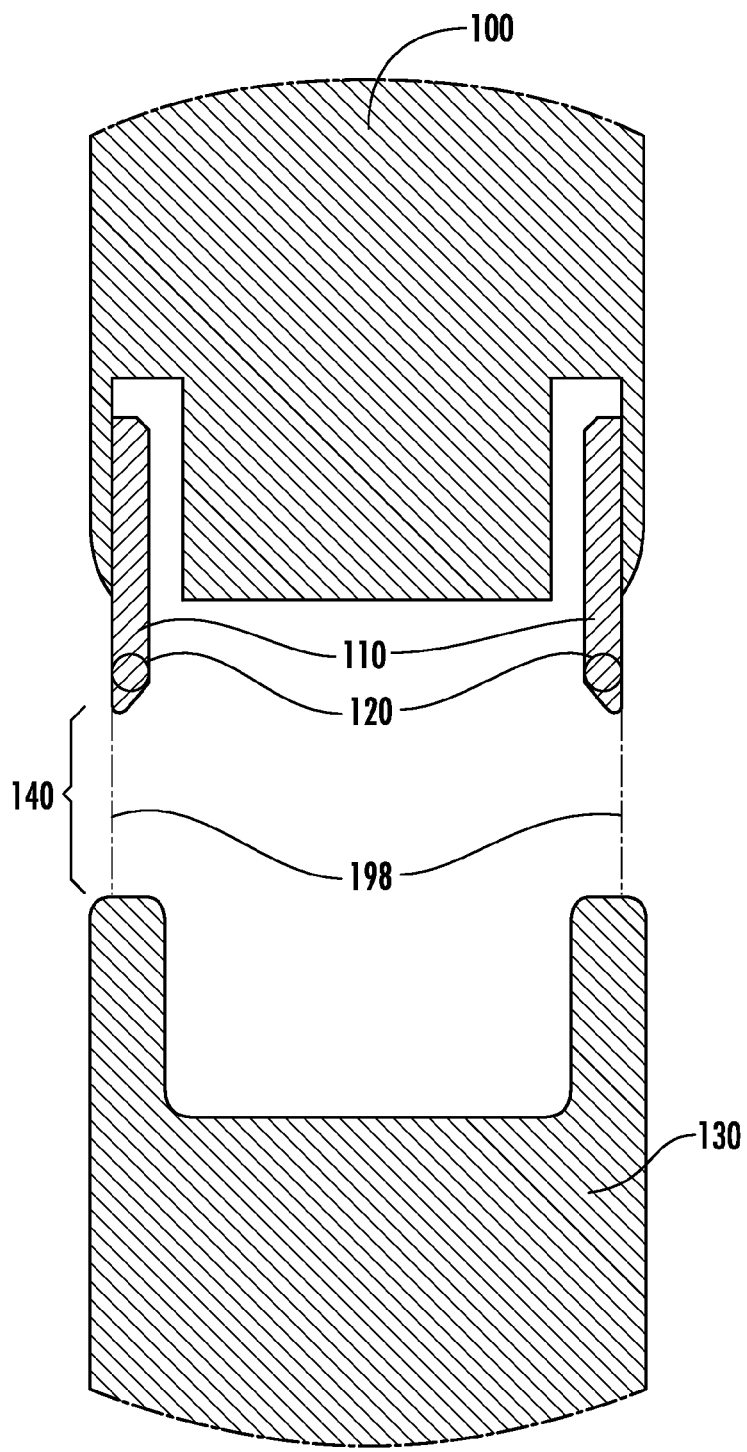

FIGS. 5A and 5B shows a cross-section elevation view of another example of the clad pipe (100) and core pipe (130) having vertically displaceable baffles (110). FIG. 5A shows another cross-section elevation view of another example of the clad pipe (100) and core pipe (130) having vertically displaceable baffles (110) having control rods (120) for adjusting the gap (140) between the lower end of the baffles and the top of the lower core pipe (130) or lower core glass stream (not shown). FIG. 5B shows the same cross-section elevation view of the clad pipe shown in FIG. 5A with the exception that the vertically displaceable baffles (110) are retracted into recesses of the upper pipe (100). Here the control rods (120), or equivalent structure, can be used for raising the baffles to adjust the gap (140) to have a larger dimension between the lower end of the baffles and the top of the lower core pipe (130) or lower core glass stream (not shown). The "drop" lines (198) in both FIGS. 5A and 5B are approximately the same since there has been only vertical displacement of the baffles (110) and no pivotal or horizontal displacement of the baffles.

Figures 6A, 6B:
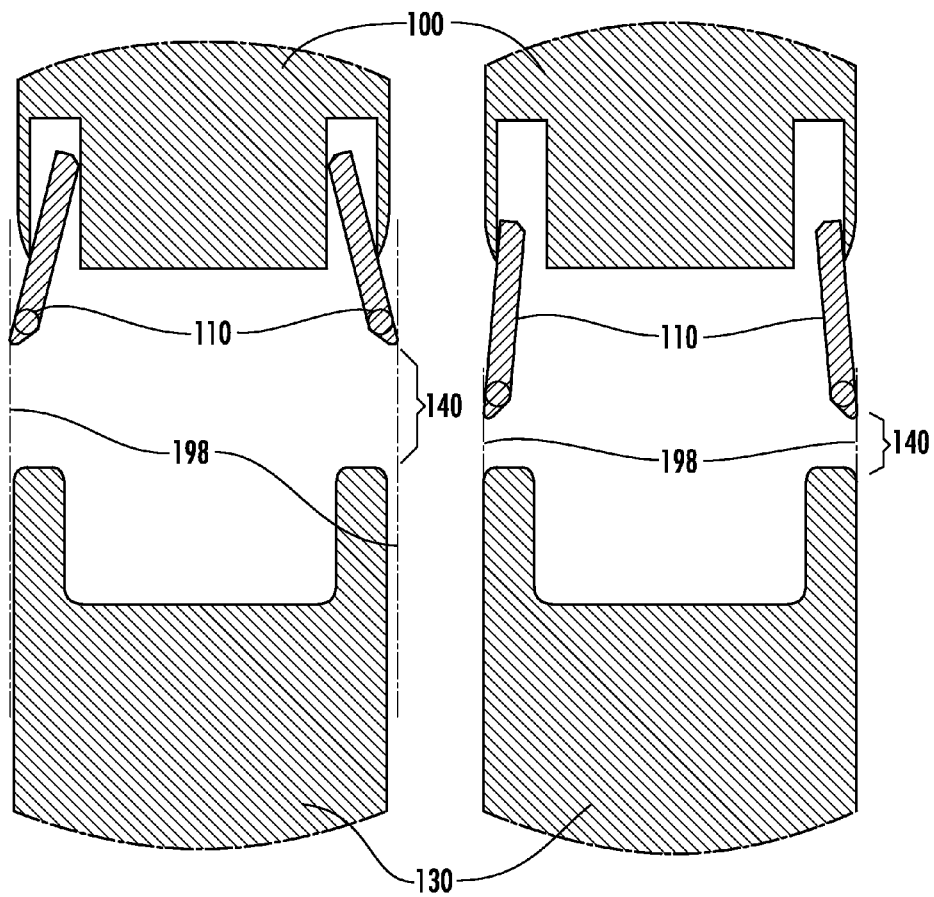
FIGS. 6A and 6B show cross-section elevation views of another example of the clad pipe (100) and core pipe (130) pair having displaceable baffles (110), which baffles are both adjustable vertically and pivotally displaceable.

FIGS. 6A and 6B shows a cross-section elevation view of another example of the clad pipe (100) and core pipe (130) having displaceable baffles (110) that are both vertically and pivotally displaceable and adjustable. FIG. 6A shows the baffles (110) vertically refracted into recesses of the upper pipe (100) and extended pivotally outward providing the resulting relatively large gap (140) and widened or broadened landing angle (the specific Φ not shown). In contrast, FIG. 6B shows the same apparatus having the baffles (110) vertically partially (shown) or fully extended downward from the recesses of the upper pipe (100) and pivotally drawn-in to provide the resulting relatively smaller gap (140), narrower landing angle (the specific Φ not shown), and "drop" lines (198) that are closer to the outer edge of the lower pipe (130).

Figure 7:
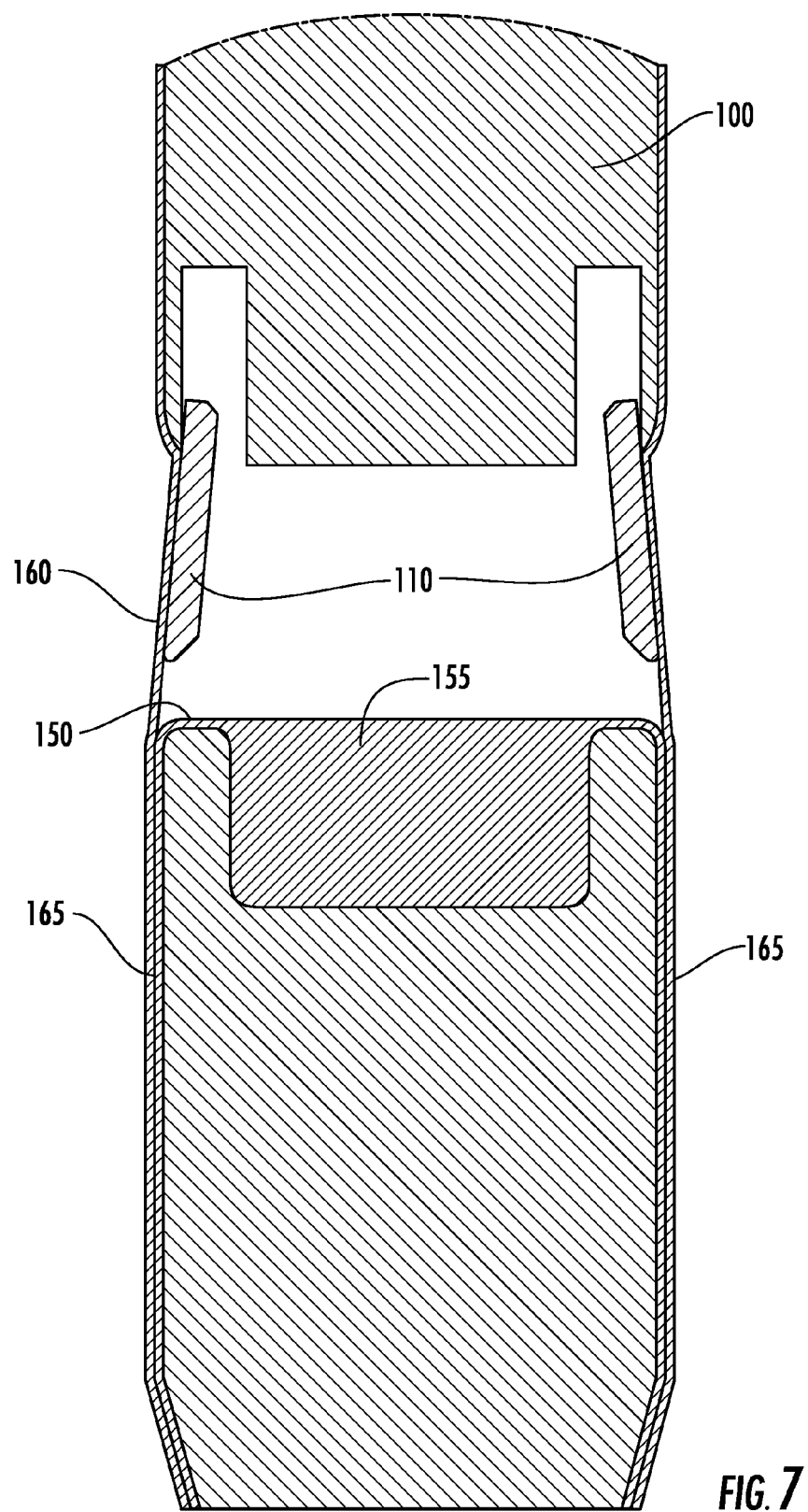
FIG. 7 shows a cross-section elevation view of another example of the clad pipe (100) having baffles (110) situated above the core pipe to manage the confluence of the respective molten glass streams.

FIG. 7 shows a cross-section elevation view of another example of the clad pipe (100) having baffles (110) situated above the core pipe to manage the confluence of the molten glass streams. The lower core pipe contains molten glass in trough (155), which when deliberately filled beyond capacity produces an overflow core glass stream (150), which stream cascades downward under gravity. The upper clad pipe (100) having baffles (110) similarly produces and provides an overflow clad glass stream (160), which stream cascades downward until it contacts the core stream (150) at a point or region determined by the outer edge of the baffles (110). The combination (i.e., confluence) of clad and core glass melt streams produce two partial laminate streams (165). The partial laminate streams (165) can continue their descent separated from the other stream, for example, to provide single-sided laminated glass, or alternatively, the separated partial laminate streams (165) can be merged or converged to a laminate sheet (not shown) having a single core (150) and a clad layer (160) on both sides of the laminate sheet. One skilled in the art recognizes that the terms "clad" and "core" are, in embodiments, relative and can be used interchangeably, for example, when a single-sided laminate is made with the disclosed apparatus and methods. For illustration purposes, FIG. 7 shows the core and the clad glass steams as having comparable thicknesses or volumes, i.e., 1:1 ratio. However, in embodiments, the respective the core (150) and clad layer (160) glass streams can have the same, similar, or dissimilar thicknesses or volumes. The core layer and a clad layers can have relative thicknesses ratio or volume ratio, for example, of from about 50:1, 20:1, 10:1; 5:1, 2:1, 1:1, 1:2, 1:10, 1:20, 1:50, and like ratios, including intermediate values and ranges.

Figure 8:
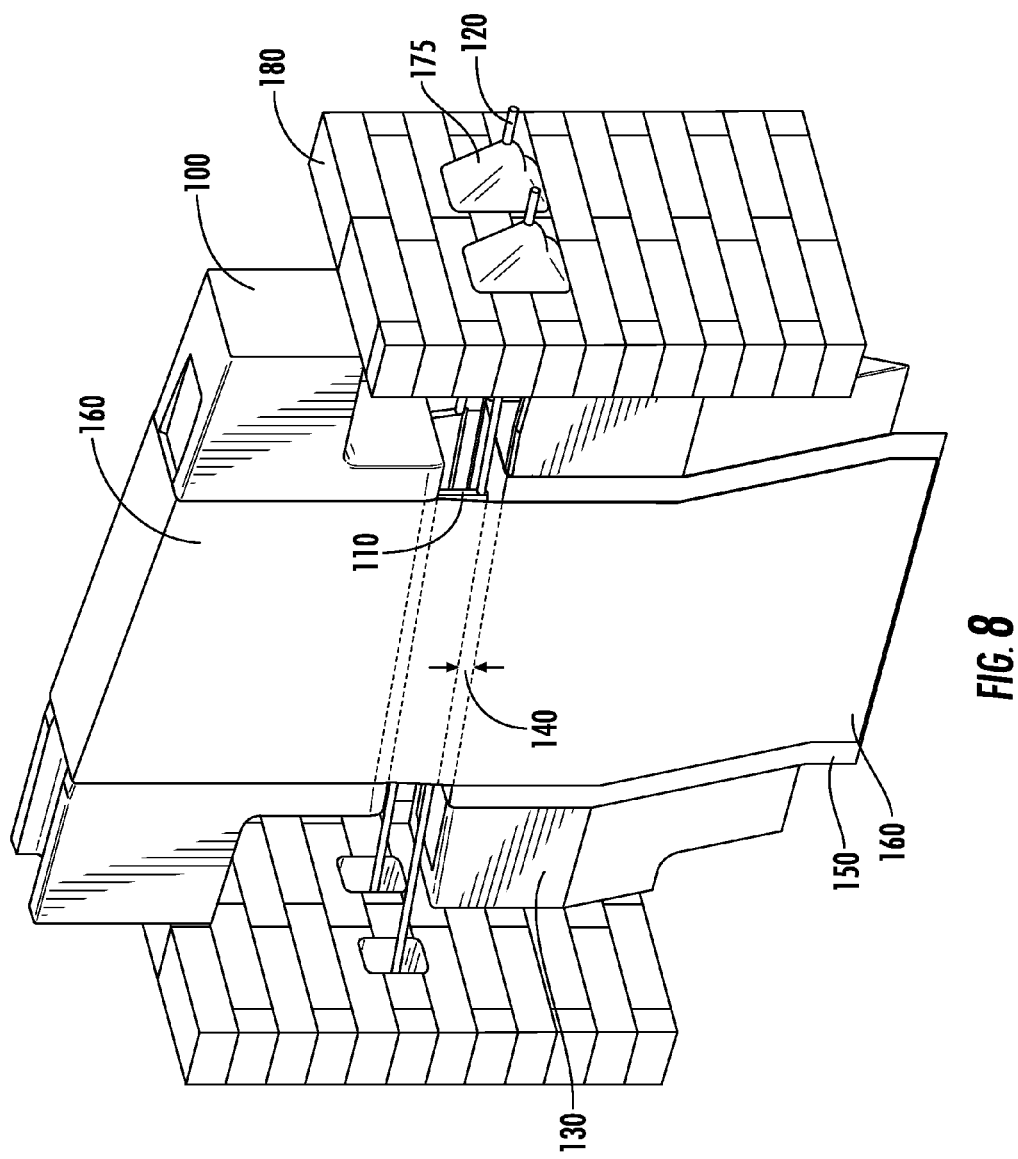
FIG. 8 shows a perspective view of aspects of the apparatus illustrated and described for FIGS. 1 to 7.

FIG. 8 shows a perspective view of aspects of the apparatus illustrated and described for FIGS. 1 to 7. Here the control rods (120), or equivalent structure, can be used for raising the baffles to adjust the gap (140) to have a larger or smaller dimension, angle, or both, between the lower end of the baffles (110) and the top of the lower core pipe (130) or the lower core glass stream (150). The properly adjusted gap (140) provides reliable control of the confluence of the upper clad glass stream (140) and lower core glass stream (150).

In embodiments, the baffles can be moveable plates located beneath or within the lower portion of the upper pipe. The plate material can include any suitable material, for example, platinum, various ceramics, high temperature metals, and like materials, or combinations thereof. At each end of the baffles are optionally rods that can, for example, extend beyond the exterior housing of the apparatus for the purpose of convenient adjustment. The gap between the bottom end of the baffles and the top of the lower pipe can be altered and the uniformity of the gap can be easily maintained or controllably changed using the adjustment rods.

In embodiments, in use of the disclosed apparatus and method, the baffles can be adjusted to correct glass flow and lamination characteristics of the resulting laminate.

In embodiments, if at the point of glass stream junction or confluence the upper clad glass stream is slower than the lower core glass stream, then the clad glass can be stretched, and the core glass will be retarded. This situation can negatively affect uniform flow distribution over the weirs (i.e., pipe barriers). In embodiments, this condition can be corrected by changing the gap by appropriate adjustment of one or both of the baffle members.

In embodiments, the gap (140) formed by the separation dimension between the ends of the baffles (110) situated at or in the upper clad pipe (100) and the lower pipe can be adjusted or advantageously changed. Increasing the size of the gap can be accomplished by, for example, holding both the upper clad pipe (100) and the lower core pipe (130) in a fixed position and having relative movement of the baffle(s) (110) away from the lower core pipe (130). The baffle (110) can be moved or adjusted vertically and away from the lower core pipe (130), that is, upward and away from the lower core pipe (130) by, for example, retracting the pair of baffles (110) into the body of the upper clad pipe (100). Conversely, the decreasing the size of the gap (140) can be accomplished by holding both the upper clad pipe (100) and the lower core pipe (130) in a constant or fixed position and having relative movement of the baffle(s) (110) toward the lower core pipe (130). In embodiments, the entire length or a portion of the baffle (110) can be moved upwardly or downwardly from an initial vertical position to alter or adjust the gap (140) by any suitable mechanism, such as a remotely situated servo motor connected to screw-lifter, which is in turn be connected to a portion of the baffle (110) or paired baffles, such as by using the adjustment or control rod (120).

In embodiments, a portion or end of the baffle (110) can be moved outwardly from an initial vertical orientation having a landing angle (Φ) of zero (Φ=0°) to a second orientation having a non-zero landing angle (Φ) of about 0.1° to 30°, about 0.1° to 20°, about 0.1° to 10°, and like landing angle values, including intermediate values and ranges. In embodiments, the end of the baffle (110) can be moved outwardly from an initial vertical orientation to alter or adjust the landing angle (Φ) by any suitable mechanism, such as a spreader mechanism (410) situated between a pair of adjacent baffles (110).

In embodiments, the baffles (110) can be adjusted in tandem or at the same time and by the same amount. Alternatively, the adjacent baffles (110) can be adjusted separately or independently of the other baffle in the pair.

In embodiments, the adjacent baffles (110) can be both gap-adjusted (i.e., vertically) and landing-angle adjusted (i.e., horizontally), simultaneously or sequentially, depending for example, on the adjustment mechanism selected. In embodiments, a suitable mechanism for adjusting both the gap and the landing-angle can be, for example, a structure that resembles or can be modeled after a fixed wing airplane's flap adjustments including both extension-retraction relative motion and for angle-of-attack relative motion. In embodiments, another suitable mechanism for adjusting either or both the gap and the landing-angle can be, for example, a flexible boot structure that can be raised or lowered to adjust the gap dimension, and controllably expanded or contracted to achieve the desired adjustment in the landing angle. The expansion or contraction of the boot can be achieved, for example, by external or internal mechanical, pneumatic, hydraulic, and like forces or pressure changes, or combinations thereof, within the boot.

In embodiments, changing the gap, i.e., the separation dimension, causes a change in the velocity of the molten glass or melt flowing from the upper clad pipe onto the molten glass melt flowing from the lower core pipe. Specifically, increasing the gap (140) separation dimension causes a relative increase in the flow velocity of the glass melt flowing from the upper clad pipe onto the lower melt flow. A decrease in the gap separation dimension typically causes a relative decrease in the flow velocity of the glass melt flowing from the upper clad pipe onto the lower melt flow.

In embodiments, if at the point of junction, the clad glass stream is faster than the core glass stream, the clad glass stream will begin to lap creating a "piling effect". This can have an impact on both the apparent glass mass distribution along the length of the pipe and the apparent glass mass distribution along the line of draw. This can cause sheet thickness variations across the draw and down the draw. A secondary issue can be the high potential for trapping air within the clad, core, or both, or between the clad and core layers, which can create seeds at the interface between the two different glass layers. This secondary issue can also be corrected by changing the gap, for example reducing the speed of the upper clad glass flow. Slowing the speed of the upper clad glass flow can be achieved by, for example, reducing the relative gap size.

In embodiments, there can be situations when one of the pipes needs to be tilted to account for flow or viscosity changes due to altering process parameters. The tilt can cause a non-uniform gap between the two pipes. If the distance between the two pipes is not uniform, velocity non-uniformity can occur down the length of the pipe, causing the above-mentioned issues. The issues can be cured or circumvented with the disclosed apparatus and method of making. The relative tilt non-uniformity condition is typically not an issue with a single fusion pipe.

The disclosure has been described with reference to various specific embodiments and techniques. However, it should be understood that many variations and modifications are possible while remaining within the scope of the disclosure.

What is claimed is:

1. A laminated glass sheet forming apparatus, comprising:
   a lower fusion pipe providing a first liquid stream that forms the core of the laminate;
   a first upper fusion pipe having a pair of adjustable baffles situated between a bottom of the upper fusion pipe and the top of the lower fusion pipe,
   the first upper fusion pipe and the pair of adjustable baffles provide a second liquid glass stream onto the first liquid glass stream, the second liquid glass stream forms a clad of the laminate on the core of the laminate,
   the adjustable baffles being separated from the lower fusion pipe by a gap, and the adjustable baffles control the landing angle ($\phi$) and drop point of the second liquid glass stream onto the first liquid glass stream.

2. The apparatus of claim 1 wherein the adjustable baffles adjust vertically to control the separation dimension of the gap between the adjustable baffles of the upper fusion pipe and the top of the lower fusion pipe, the adjustable baffles adjust angularly to control the landing angle ($\phi$) of the second overflow glass melt onto the first overflow glass melt, and the adjustable baffles adjust angularly and vertically.

3. The apparatus of claim 1 wherein the adjustable baffles adjust vertically to control the separation dimension of the gap between the adjustable baffles of the upper fusion pipe and the top of the lower fusion pipe.

4. The apparatus of claim 1 wherein the adjustable baffles adjust angularly to control the landing angle ($\phi$) of the second liquid glass stream onto the first liquid glass stream.

5. The apparatus of claim 1 wherein the adjustable baffles are situated within the bottom of the first upper fusion pipe and generally extend downward toward the top of the lower fusion pipe.

6. The apparatus of claim 1 wherein the spatial orientation of the lower fusion pipe relative to the upper fusion pipe is fixed.

7. The apparatus of claim 1 wherein each of the adjustable baffles is connected to the upper fusion pipe at one end, and each of the adjustable baffles has at least one adjustment rod near the gap end to adjust the gap dimension.

8. The apparatus of claim 1 wherein the molten glass feed that supplies the lower fusion pipe and the upper fusion pipe is provided from the same end or the opposite ends of the fusion pipes.

9. The apparatus of claim 1 wherein one baffle of the pair of adjustable baffles is positioned differently from the other baffle of the pair to provide a flow difference over one weir of the upper fusion pipe compared to the other weir of the upper fusion pipe, which differential flow provides a laminate sheet glass having a thicker clad on one side of the core glass and a thinner clad on the other side of the core glass.

10. The apparatus of claim 1 further comprising a plurality of upper fusion pipes, each additional upper fusion pipe having a pair of adjustable baffles situated between the bottom of each additional upper fusion pipe and the top of a preceding lower fusion pipe, and each additional upper fusion pipe provides an additional liquid glass stream onto the preceding liquid glass stream that forms an additional clad layer on one or both sides of the laminate.

11. The apparatus of claim 1 wherein the separation dimension of the gap ($\theta$) between the adjustable baffles and the lower fusion pipe is substantially equidistant across the entire span of the gap, the separation dimension of the gap between the adjustable baffles and the lower fusion pipe is non-equidistant across the entire span of the gap, or a combination thereof.

12. The apparatus of claim 1 wherein the lower fusion pipe providing the first liquid stream forms a single core or two separate cores.

13. A method for forming laminated sheet glass in the apparatus of claim 1, comprising:
   flowing a first liquid stream over the lower fusion pipe to form the core of the laminate; and
   flowing a second liquid stream over the upper fusion pipe, then the pair of adjustable baffles, and then onto to the first liquid stream to form the clad of the laminate on the core of the laminate.

14. The method of claim 13 further comprising adjusting the adjustable baffles to change the gap, the landing angle ($\phi$), or combinations thereof, of the second liquid stream onto to the first liquid stream.

15. The method of claim 13 further comprising having a plurality of upper fusion pipes having a pair of adjustable baffles stacked above the upper fusion pipe to provide a laminate sheet glass where the number of clad layers corresponds to twice the number of total upper fusion pipes.

16. The method of claim 13 wherein the core comprises a single core or two separate cores.

* * * * *